United States Patent [19]

Hashimoto

[11] Patent Number: 4,860,134
[45] Date of Patent: Aug. 22, 1989

[54] DOUBLE VIDEO CASSETTE TAPE RECORDER

[75] Inventor: Kazuo Hashimoto, Tokyo, Japan

[73] Assignee: Hashimoto Corporation, Tokyo, Japan

[21] Appl. No.: 138,895

[22] Filed: Dec. 28, 1987

[30] Foreign Application Priority Data

Dec. 30, 1986 [JP] Japan .................... 61-311788

[51] Int. Cl.⁴ .................... G11B 15/665; G11B 15/295
[52] U.S. Cl. .................... 360/92; 360/85; 360/95
[58] Field of Search ............ 360/92, 91, 85, 84, 360/95

[56] References Cited

U.S. PATENT DOCUMENTS

| | | | |
|---|---|---|---|
| 3,640,479 | 2/1972 | Hata | 360/91 |
| 3,921,216 | 11/1975 | Wada | 360/92 |
| 3,999,219 | 12/1976 | Andrews | 360/92 |
| 4,583,137 | 4/1986 | Ogiro et al. | 360/85 |
| 4,698,705 | 10/1987 | Umino | 360/92 |

FOREIGN PATENT DOCUMENTS 2802255 8/1978 Fed. Rep. of Germany ........ 360/92
54-14217 2/1979 Japan ........................ 360/92
80/01027 5/1980 PCT Int'l Appl. ........... 360/92

OTHER PUBLICATIONS

Fisk et al., "Direct Access Tape File," IBM/TDB, vol. 13, No. 2, Jul. 1970, p. 393.

*Primary Examiner*—John H. Wolff
*Assistant Examiner*—Matthew J. Bussan
*Attorney, Agent, or Firm*—Lowe, Price, LeBlanc, Becker & Shur

[57] ABSTRACT

As an alternate to two separate video tape recorders are operated to perform dubbing or the like, the present invention provides a double video cassette tape recorder for dubbing, wherein one of two video tapes is inserted at an upper position and another tape at a lower position in the same or separate cassette by front loading, and the two tapes can be separately or simultaneously driven to record and play back using a common capstan and cylinder heads for each tape in the limited space of housing. The double video cassette tape recorder for dubbing according to the present invention does not take up space for installation, and the inside mechanism can be used commonly to conventional VCR to save cost.

2 Claims, 4 Drawing Sheets

DOUBLE VIDEO CASSETTE TAPE RECORDER

BACKGROUND OF THE INVENTION

The present invention relates to a double video cassette tape recorder for driving a plurality of tapes simultaneously or separately.

In conventional video cassette tape recorders (hereinafter called a VCR), a tape is driven for one cylinder head to record or play back.

And a VCR for dubbing, wherein one of two cassette tapes is located into one side of the cylinder head and another tape into another side of said cylinder head to play back one tape and to simultaneously record said playback on another tape, is disclosed in JAPAN S59-161536 A.

In said VCR with two cassette tapes on both sides of a cylinder head, it is necessary to insert the cassette tapes into a front side or a rear side of said VCR, so it is difficult to insert said tapes into the rear side of the VCR if said VCR is installed close to a wall of a room. Even if it is arranged to insert the cassette tapes into both left and right sides of the VCR in order to make up for this problem, a large amount of space in width is needed to install the VCR, and the VCR takes up totally a large space.

SUMMARY OF THE INVENTION

It is a first object of the present invention to provide a double video cassette tape recorder including an upper and a lower tape in the same or separate cassette which can be separately driven; reel drive means for incorporating each of said tapes to an upper and a lower head from front side; a left and a right lower slider means having an inclined post and a guide roller respectively; an upper slider means having an inclined post and a guide roller which are vertically movable; an upper and a lower loading mechanism for supporting respectively said upper and lower slider means; an upper and a lower independently rotatable pinch roller; and a common capstan, wherein said lower tape is to be passed to said lower head under conduct of said inclined post and said guide roller which are fixed to said lower slider means, said lower tape is driven by said common capstan and said lower pinch roller.

It is a second object of the present invention to provide a double video cassette tape recorder as in the above first object, wherein under contact of said inclined post and said guide roller on the upper slider means which are vertically movable, said upper tape is to be passed on said upper head and driven by said common capstan and said upper pinch roller, and a predetermined tension is supplied to said tape by said upper reel drive means.

It is a third object of the present invention to provide a double video cassette recorder as in the first object, wherein when said upper and lower slider means are simultaneously moved, said reel drive means and said upper and lower pinch rollers are simultaneously or independently rotated, and said upper and lower tapes are simultaneously driven; whereas when said upper and lower slider means are separately moved, said reel means and said upper and lower pinch rollers are separately rotated, and said upper and lower tapes are separately driven.

The above and other objects, features and advantages of the present invention will become apparent from the following description when taken in conjunction with the accompanying drawings in which a preferred embodiment of the present invention is shown by way of illustrative example.

BEST MODE FOR PRACTICING THE INVENTION

Figure 1:
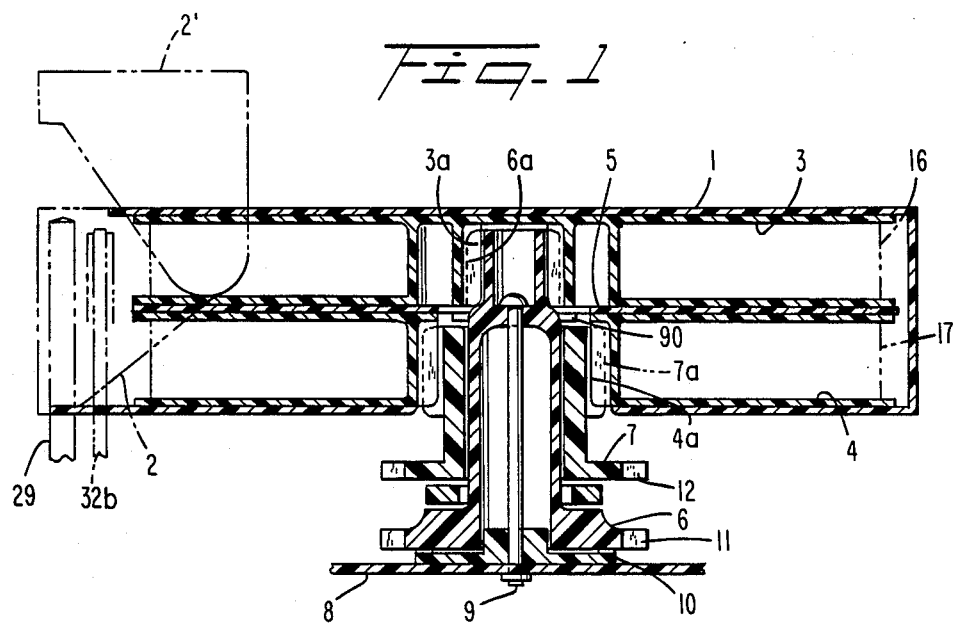
FIG. 1 is a vertical sectional view of a cassette and a reel drive spindle.

As follows, a preferred embodiment of this invention is described in accordance with FIG. 1–FIG. 10.

1 is a standard cassette. A lid 2 is held at a side for sending tape of the cassette 1. When the cassette 1 is set in the VCR, the lid 2 changes to be in an upright posture as 2'. 3 and 4 are reels for tape set at an upper position and a lower position. A moving board 5 is set between the reel 3, and the reel 4 is set in the standard cassette 1. A spline 3a is set at the center of the upper position reel 3, and engages with a spline 6a set at upper position of an upper position reel driving shaft 6 set in the VCR. A spline 4a is set at the center of the lower position reel 4 and engages with a spline 7a set at the lower reel driving shaft 7.

Up-and down motion of the lower position reel driving shaft 7 is restricted by an outside circuit of the upper position reel driving shaft 6, and the lower position reel driving shaft 7 is set to be above to rotate, and also up-and-down motion of the upper position reel driving shaft 6 is restricted by a stop shaft 9 which connects a base board 8 to the upper position reel driving Shaft 6, and the upper position reel driving shaft 6 is set to be able to rotate on the base board 8 through a moving piece 10. The upper position reel driving shaft 6 and the lower position reel driving shaft 7 respectively have gear 11, 12 at lower outside circuit, and the gears 11, 12 rotate at the same time or separately by a driving device (not shown).

Figure 2:
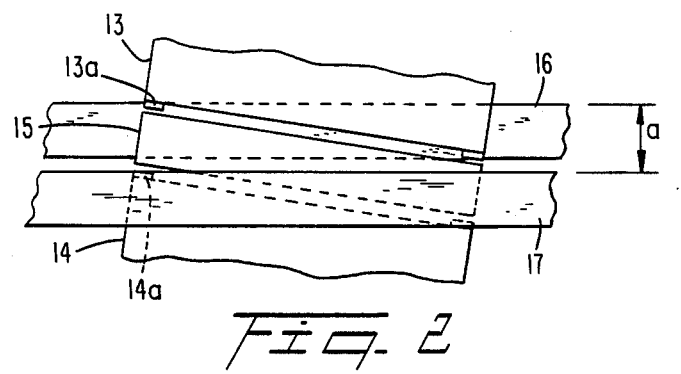
FIG. 2 is a side view which shows a main part of an upper and a lower cylinder heads.

FIG. 2 shows a double head for the portrait at the upper and lower side. In FIG. 2, 13 is an upper side revolution cylinder. 14 is a lower side revolution cylinder. 15 is a fixed cylinder. Surfaces of each cylinder are the same and are arranged on same shaft, and the upper side revolution cylinder 13 and the lower side revolution cylinder 14 rotate precisely at a predetermined speed. Upper and lower side tapes 16, 17, which drive at a predetermined speed, are guided by the upper side and lower side revolution cylinders 13, 14 which rotate at a high speed, and by the fixed cylinder 15.

Recording or play back of the upper side tape 16 is done in the reverse side of the upper side revolution cylinder 13 by second head 13a which is set symmetrically at an end of the upper side revolution cylinder 13. Similarly, recording or play back of the lower side tape 17 is done in this side of the lower side revolution cylinder 14 by the head 14a. And when the space "a" on the tape 16, 17 is wide, the fixed cylinder becomes long.

Figure 3:
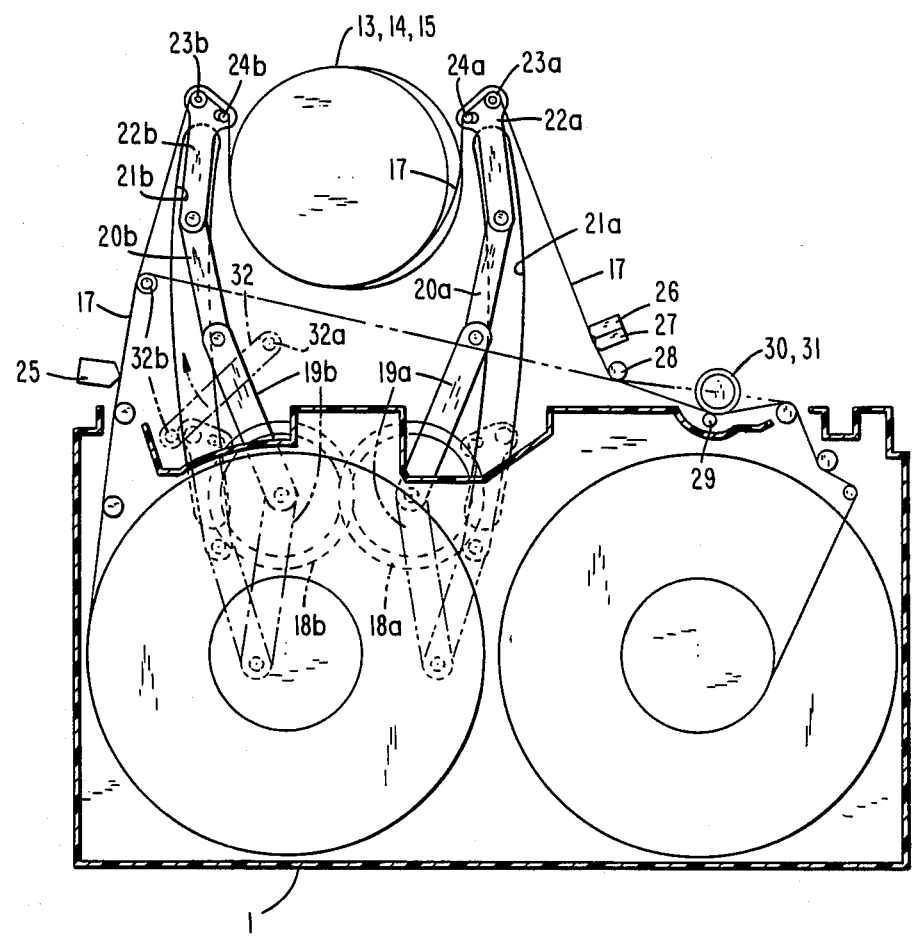
FIGS. 3 and 4 are plan views which show an upper and a lower slider means and upper and a lower loading mechanisms of VHS and Beta type.

A lower side slider and lower loading are known widely, for example, a link type loading mechanism shown in the FIG. 3 is explained as follows. 1 is the cassette set in the VCR. 18a and 18b are same sized gears which mesh with each other and are set to be able to rotate on the base board 8 (not shown). One side of the link 19a, 19b, which have same length, is fixed on the center of the gear 18a, 18b, and the other side of link 19a, 19b is held at one side of link 20a, 20b which has same length. And the other sides of link 20a, 20b are guided by a fixed guide groove 21a, 21b, and are held at a rear end of a slider 22a, 22b. A guide roller 23a, 23b, and inclination post 24a, 24b having enough height to be connected only to the lower side tape 17, are set on the surface of the extreme pont of the slider 22a, 22b. The gears 18a, 18b are driven by a driving device (not shown). The guide roller 23a, 23b and the inclination post 24a, 24b can move from the position shown in the figure by a dotted line of this side of a receiving position of the tape 17 in the cassette 1 to the position shown in figure of both sides of the cylinder 13, 14 and 15.

Figure 10:
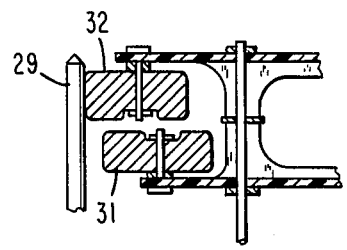
FIG. 10 is a sectional side view of a capstan and a pinch roller.

Entire width elimination head 25 is set to be contacted to the extreme upper side of recording position of the tape 17. An elimination head 26, and an audio head, and a control head 27, a fixed post 28, common capstan 29 and two pinch rollers 30, 31 to press the capstan 29 at the same time or separately are set at a lower side of loading position of the tape 17 (FIG. 10). The entire width elimination head 25, the elimination head for audio 26, and the audio head and the control head 27 have a head which can also operate the upper side tape 16. As shown in FIG. 1, the common capstan 29 is set to be able to rotate at this side of the tape 16, 17 when the cassette 1 is set.

A base 32a of the tape pull arm 32 which does not always need to pull out the lower tape 17, is set to be able to rotate on the base board 8 (not shown) which locates lower side of the guide groove 21b. The guide roller 23b set at the extreme point of the tape pull arm 32 has enough length to be connected to the lower side and upper side tapes 16, 17, and does not interfere with the guide groove 21b, and can move from the inside position (FIG. 1) of the cassette 1 shown outside of the inside position by a dotted line to the position shown by a solid line.

Figure 4:
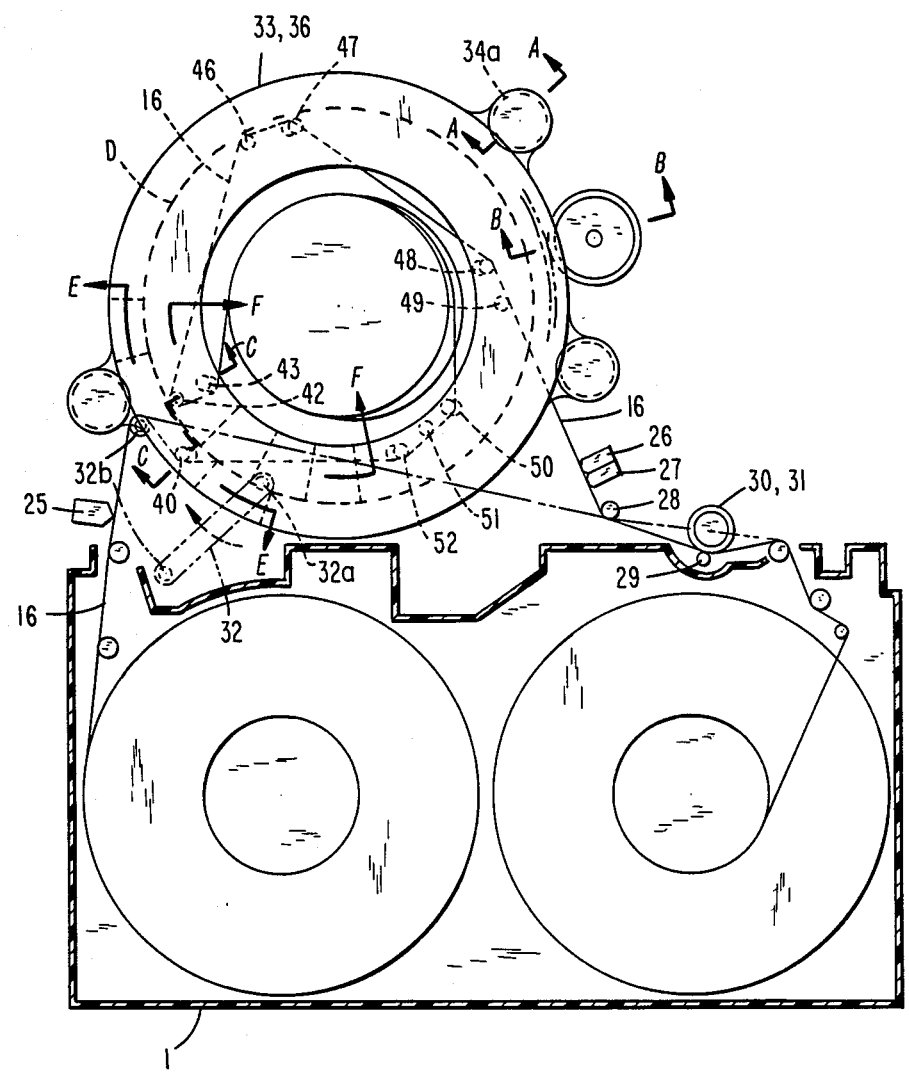
Figure 5:
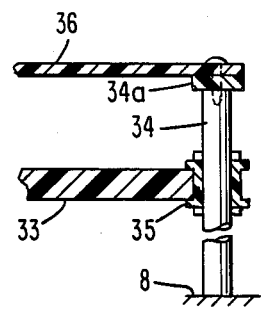
FIGS. 5, 6, 7, 8 and 9 are sectional views of A to A, C to C, B to B, F to F and E to E in FIG. 4, respectively.
Figure 6:
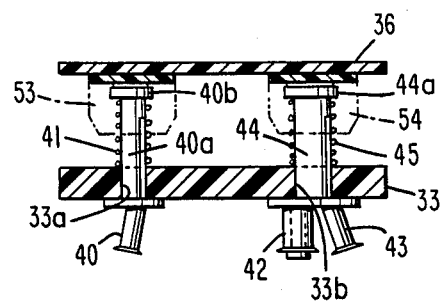

The lower slider and the lower loading mechanism in this invention are explained in accordance with FIG. 4. 1 is the cassette. 25 is the entire width elimination head. 26 is the elimination head for audio. 27 is the audio head and control head. 28 is the fixed post. 29 is the common capstan. 30, 31 are the pinch rollers. 32, 32a, and 32b are the tape pull arm. 33 is a revolution ring. And the circumference of the revolution ring 33 is held by a shaft support 35 set on the middle point of a support 34 set on the base board 8. A ring shaped cam board 36 is fixed horizontally on the upper section of the support 34 through an insertion 34a. The revolution ring 33 rotates by a pinion 39 of a motor 38 which gears with a ring gear 37 of an outside gear set on the outside lower surface of the revolution ring 33. And a base with key groove 40a of the inclination post 40 which does an up-and down motion and inclines to lower side, is inserted to the hole with key 33a of the revolution ring 33 as shown in a section C—C in the FIG. 4 (FIG. 6). And between a flange section 40b on upper point of the base 40a and the revolution ring 33, a compression spring 41 is inserted to the base 40a.

Similarly a base with key groove 44 having the guide roller 42 and the inclination post 43 is inserted to the hole with key 33a of the revolution ring 33, and between a flange section 44a on upper point of the base 44 and the revolution ring 33, a compression spring 45 is inserted to the base 44. And a post 46, an inclination post 47, a post 48, and an inclination post 49 are set as pair or separation to be able to do up-and-down motion at the revolution ring 36 as shown in the figure. And a fixed inclination post 50, a fixed post 51 and a fixed inclination post 52 are set on the lower surface of the revolution ring 36 and are faced to lower side to be contacted to the upper side tape 16.

The only inclination post 40 which does an up-and-down motion is set in the outside field which divides the revolution ring 36 by circle D of dotted line. The other inclination post and the guide roller 42, 43, 46, 47, 49 are set in the inside field by circle D. And as shown in the FIG. 9 which is a section E—E of FIG. 4, a cam 53 made of wear proof material is set at the lower outside of the cam board 36, on which the distance between point A and point B comes down, the distance between point B and point C is horizontal, the distance between point C and point D comes up, and the distance between point D and point A is horizontal, in a plane made of the distance between point D and point A.

The inclination post 40 shown in the FIG. 6 does not connect with the upper section tape 16, and is pressed to lower section by standing against a spring power of the compression spring 41 by a plane section made of the distance between point B and point C of the cam 53, and is connected to the upper tape 16. Similarly, as shown in the FIG. 8 which is the section F—F of the FIG. 4, the guide roller 42, the inclination post 43, 37, 48 and the post 46, 49 are connected to the upper tape 16 in the distance between point F and point G by the cam 54 set at lower surface of the cam board 36, but connected to the upper tape 16 by standing against a spring power of the compression spring 45 and by the cam 54 pressing in the distance between point H and point E.

Operation of the example of this invention is explained as follows. The cassette 1 set at the upper and lower position reel 3, 4 set at the upper and lower side tape 16, 17 and the upper and lower section tape shown in the FIG. 1 is set in the VCR. As a result, the lid 2 is opened to position 2', and the spline 3a, 4a of the upper and lower section reel 3, 4 gear with the spline 6a, 7a of the upper and lower position reel driving shaft 6,7 set on the base board 8 of the VCR When the lower side tape 17 is recorded and played back, the key for recording and play back for the lower tape 17 (not shown) is pushed. As a result, the cylinder 13, 14 the lower section pinch roller 31, the lower position reel driving shaft 7 of side of rolling in (the right side in the FIG. 3), the gear 18a, and the tape pull arm 32 are operated by operation devices (not shown) operated by a signal from the key. And the cylinder 13, 14 turns, and the lower section tape 17 is connected to the capstan 29 by the lower section pinch roller 31. The lower section tape 17 moves and is rolled into the lower section reel 4 of the right side. And the tape pull arm 32 moves clockwise centering around the base 32a, and the guide roller 32b moves to 32b of position shown by the solid line. Gear 18a moves counter-clockwise.

The lower section slider 22a is guided to the guide groove 21a through the link 19a and link 20a, and is connected to a stripper (not shown) or an end of the guide groove 21a in right side of the cylinder 13, 14 and 15. The lower section slider 22b is guided to the guide groove 21a through the gear 18b, the link 19b and the link 22b, and is connected to a stripper (not shown) or the end of the guide groove 21b in the left side of the cylinder 13, 14 and 15. The lower side tape 17 is guided by the guide roller 32b, 23b, the inclination post 24a, 24b and the guide roller 23a and is connected to the surface of this side of the cylinder 14, 15 as shown in the FIG. 2 between the inclination post 24b and the inclination post 24a. When recording is done, information on the lower side tape 17 is eliminated by the entire width elimination head 25, and information is recorded on the lower side tape 17 diagonally by an electric signal. And recorded information and recording end on video of recording section of both sides on the lower side tape 17 are eliminated by the elimination head for audio 26, and the recording signal and the control signal are recorded on the end of both sides of the lower side tape 17. The lower side tape 17 moves to right side at fixed speed by pinching of the lower side pinch roller 31 and the common capstan 29.

When playback is done, the entire width elimination head 25 and the elimination head for audio 26 are not operated, and the lower side tape 17 is only guided. When information is recorded on the upper side tape or when information on the upper side tape is played back, the key (not shown) by recording or playback for the upper side tape 16 is input, and, the cylinder 13, 14, the upper side pinch roller 30, the upper position reel driving shaft 6 and the tape pull arm 32 are operated by an operational system (not shown). As a result, the cylinder 13, 14 rotate, the upper side pinch roller 30 presses the upper side tape 16 to the common capstan 29 and the upper side tape 16 moves and is rolled in the upper side reel 3 of right side in the figure. And the tape pull arm 32 moves clockwise, centered about the base 32a.

Figure 7:
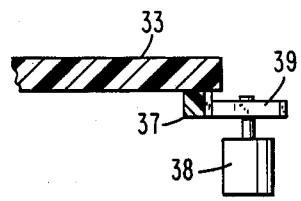

When the guide roller 32b has finished moving to the position of 32b shown by the solid line, the motor 38 shown in FIG. 7 is operated, the revolution ring 33 starts to rotate clockwise from the position shown in the FIG. 4. At this time, the inclination post 40 is between B and C of the cam 53, and is connected to the upper side tape 16, and draws the upper side tape to this side, and reaches D of the cam 53 at once. As a result, the connection between the inclination post and the upper side tape is released.

Figure 8:
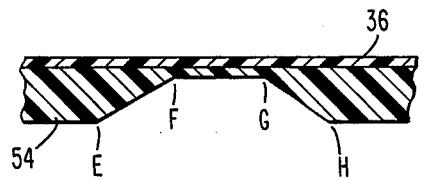
Figure 9:
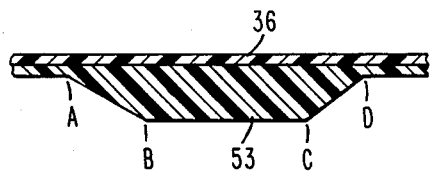

The guide roller 42 and the inclination post 43 are connected to the upper side tape 16 at this side of the cam 54 shown in the FIG. 8. The guide roller 42 and the inclination post 43 move up between F and G of the cam 54. And the connection between the guide roller 42, the inclination post 43 and the lower side tape 16 is released.

The guide roller 42 and the inclination post 43 pass over the upper side tape 16. In the lower and front side of the upper side tape 16, the guide roller 42 and the inclination post 43 are pushed to the lower side by a plane of the came 54 and are connected to the lower side tape 16, and pull out the lower side tape 16. The revolution ring 33 rotates, and as a result, the upper side tape 16 is wound around the cylinder 13, 14 and 15. And the post 46, the inclination post 47, continuously the inclination post 48, and the post 49 pass over the upper side tape 16 between F and G of the cam 54, and are connected to the upper side tape 16 from inside (this side) of the upper side tape 16 in the plane of the cam 54, and guide the upper side tape 16 to make the upper side tape 13, 15 like hook type.

The fixed inclination post 50, 52 and the post 51 guide the upper side tape 16 from outside by further revolution of the revolution ring 33. When the revolution ring 33 finishes about one revolution, the inclination post 40 reaches between B and C of the cam 53, and guides the upper side tape 16 to this side of the inclination post 40. As a result, loading of the upper side tape 16 is finished by finishing one revolution of the revolution ring 33. The upper side tape 16 is sent from the upper side reel 3 of left side, and is guided by the post, the entire width elimination head 25, the guide roller 32b, the inclination post 41, 52, the post 51, the inclination post 50, cylinder 13, 14, the inclination post 43, the guide roller 42, the post 46, the inclination post 47, 48, the post 49, the elimination head for audio head 26, the audio head and control head 27, the post 28, the capstan 29 and the upper side pinch roller 31 in the cassette, and the post in the cassette, and is rolled in the upper side reel 3 of right side. In the above, even if there is a difference between the position connected to the cylinder and the height of a gateway for tape of the cassette, the upper side slider and the lower loading mechanism can operate to load the tape easily and smoothly by raising (or going down) a tape position of an entrance side of the cylinder 13, 15, or by going down (raising) a tape position of an exit side by a pair of the inclination post 40, 52 and a pair of the inclination post 47, 48.

As regards recording or play back, there is a similar explanation on the lower slider and the lower loading mechanism. The revolution ring 33 rotates in the opposite way, and as a result loading of tape is released. As above, the tape is guided by the guide roller, the post and the inclination post from upper side of the tape, which are operated by the post to be able to do an up-and-down motion, the inclination post, the revolution ring having the guide roller, and the cam board set on upper side of the revolution ring.

It is possible to load double tape styled cassette which has two tapes. A necessary area of double tape styled VCR is reduced, and it is possible to set a cassette from this side of VCR. As a result, it is possible to set the VCR in the room easily and conveniently. The height of the double tape styled VCR can be made low, and construction parts of the upper and lower loading mechanism can be used in common by setting two tapes in one cassette. And the upper side tape and the lower side tape can record or play back at the same time or separately. As a result, two programs can be recorded at the same time, and recorded program is played back on two televisions at the same time. And, after a tape is played back, it can be recorded on the other tape, and dubbing is done on the tape in company with playing back the other tape.

In dubbing, it is easy to set the upper slider and the upper loading mechanism in this invention in the double cassette styled VCR having one tape in each cassette, because, they are set on the upper side of the upper side tape (they are not between the upper side tape and the lower side tape). And even if the upper side cassette is set at the high position, the upper side tape can be guided low. Accordingly the double revolution cylinder can be set near. As a result, the double cylinder typed head for a portrait can be kept in high precision easily.

As above, this invention sets tapes of the upper and lower sides in one cassette in the double tape styled VCR, and the pages are operate at the same time or separately. As a result, a necessary area of double tape styled VCR is reduced, and it is possible to set a cassette from this side of VCR. As a result it is possible to set VCR in the room easily and conveniently.

What is claimed is:

1. A double video cassette tape recorder, comprising:
   upper and lower tapes, in a cassette which enables said upper and lower tapes to be separately or simultaneously driven;
   tape drive means for driving said tapes past an upper and a lower cylinder-type head, respectively, for interaction therewith;
   left and right lower slider means having inclined posts and guide rollers which are supported on a tape deck of said recorder outside of said cassette for guiding said lower tape;
   upper slider means having inclined posts and guide rollers which are vertically movable for guiding said upper tape;
   upper and lower loading mechanisms for supporting separately each of said upper and lower slider means;
   upper and lower movably supported and separately rotatable pinch rollers; and
   a common capstan to which said upper and lower tapes are pressed by selective movement thereagainst by said upper and lower pinch rollers respectively to be driven separately or simultaneously, to record or play back.

2. A double video cassette tape recorder, according to claim 1, wherein:
   said upper slider means comprises rotatable means having an inclined guide post and a guide roller which are movable slidingly downward along a main shaft normal to a plane of the rotatable means, for passing said upper tape to a side of said upper cylinder-type head;
   cam means set to an upper side of said rotatable means for driving said inclined guide post and guide roller downward along said main shaft; and
   movable arm means for taking out at least one of said tapes from said cassette.

\* \* \* \* \*

UNITED STATES PATENT AND TRADEMARK OFFICE
CERTIFICATE OF CORRECTION

PATENT NO. : 4,860,134

DATED : August 22, 1989

INVENTOR(S) : Kazuo HASHIMOTO

It is certified that error appears in the above-identified patent and that said Letters Patent is hereby corrected as shown below:

In the Specification, please make the following corrections:

Column 1, line 48, change "contact" to --influence--;

Column 3, line 47, change "lower" to --upper-- (both occurrences);

Column 6, line 12, change "41" to --40--;

line 67, change "pages" to --tapes--.and change "operate" to --operated--.

Signed and Sealed this

Fourth Day of September, 1990

Attest:

HARRY F. MANBECK, JR.

Attesting Officer    Commissioner of Patents and Trademarks